US009028769B2

(12) United States Patent
Vigier et al.

(10) Patent No.: US 9,028,769 B2
(45) Date of Patent: May 12, 2015

(54) HANDHELD PORTABLE OXYGEN GENERATOR FOR USE IN EXTREME ENVIRONMENTS

(71) Applicant: Combat Critical Care, Irvine, CA (US)

(72) Inventors: Francois Vigier, Irvine, CA (US); Ahmad Marshall, Corona, CA (US); Gerald White, Garden Grove, CA (US); Tae Kim, Orange, CA (US); Francisco Castro, Santa Ana, CA (US); Emmanuel Angelo Fantuzzi, Irvine, CA (US)

(73) Assignee: Pacific Precision Products Mfg., Irvine, CA (US)

( * ) Notice: Subject to any disclaimer, the term of this patent is extended or adjusted under 35 U.S.C. 154(b) by 150 days.

(21) Appl. No.: 13/717,499

(22) Filed: Dec. 17, 2012

(65) Prior Publication Data

US 2014/0248195 A1    Sep. 4, 2014

Related U.S. Application Data

(60) Provisional application No. 61/570,926, filed on Dec. 15, 2011.

(51) Int. Cl.
*C06B 45/00* (2006.01)
*F42B 4/00* (2006.01)
*C06D 5/00* (2006.01)
*B60R 21/16* (2006.01)
*A62B 7/08* (2006.01)

(52) U.S. Cl.
CPC . *A62B 7/08* (2013.01); *Y10S 280/07* (2013.01)

(58) Field of Classification Search
CPC ............. A61J 1/00; A61K 8/33; B65D 81/38; C06D 5/00
USPC .......... 422/125–126, 305; 102/200, 283, 335, 102/530; 280/728.1, DIG. 7
See application file for complete search history.

(56) References Cited

U.S. PATENT DOCUMENTS

| | | | |
|---|---|---|---|
| 2,558,756 | A | 7/1951 | Jackson et al. |
| 3,565,068 | A | 2/1971 | Bickford |
| 3,580,250 | A | 5/1971 | Oroza |
| 3,742,683 | A | 7/1973 | Sebest et al. |
| 3,762,407 | A | 10/1973 | Shonerd |
| 3,868,225 | A | 2/1975 | Tidd |

(Continued)

OTHER PUBLICATIONS

AVOX Systems Inc., Protective Breathing Equipment Product Brochure, Sep. 2004.

(Continued)

*Primary Examiner* — Monzer R Chorbaji
(74) *Attorney, Agent, or Firm* — Kilpatrick Townsend & Stockton LLP

(57) ABSTRACT

The oxygen generation system includes a chemical oxygen generator that creates oxygen through an exothermic chemical reaction that creates sufficient heat to pose a serious risk to a user. The oxygen generation system therefore includes a containment layer to permit safer administration of oxygen from a chemical oxygen generator by shielding a user from and/or dissipating the heat generated by the chemical generator. The oxygen generation system may be handheld and portable for use in extreme, remote, and/or hostile conditions, locations, environments, and situations with a simple activation method easily operated under stress without any preparation or maintenance.

26 Claims, 10 Drawing Sheets

(56) References Cited

U.S. PATENT DOCUMENTS

| | | |
|---|---|---|
| 3,955,931 A | 5/1976 | Thompson |
| 4,164,218 A | 8/1979 | Martin |
| 4,342,725 A | 8/1982 | Collins |
| 4,671,270 A | 6/1987 | Kato |
| 5,113,854 A | 5/1992 | Dosch et al. |
| 5,620,664 A | 4/1997 | Palmer |
| 5,750,077 A | 5/1998 | Schoen |
| 7,371,350 B2 * | 5/2008 | Jones et al. .............. 422/120 |

OTHER PUBLICATIONS

Drager, Protective Breathing Equipment Oxycrew Component Maintainence Manual with Illustrated Parts List, Apr. 30, 2001.

HABCO, TraumAid Portable Oxygen Generator, available at <<http://traumaid.biz/about/about-traumaid/>>, last accessed Dec. 17, 2012.

Molecular Products Inc., Ruggedised Oxygen Generator (ROG) Product Brochure, Feb. 2012.

* cited by examiner

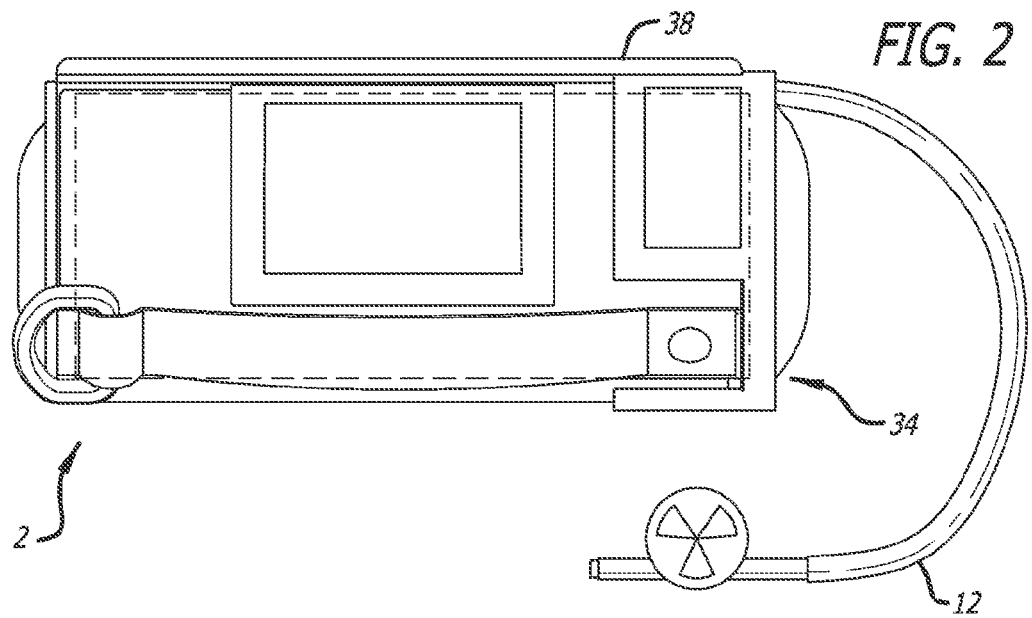
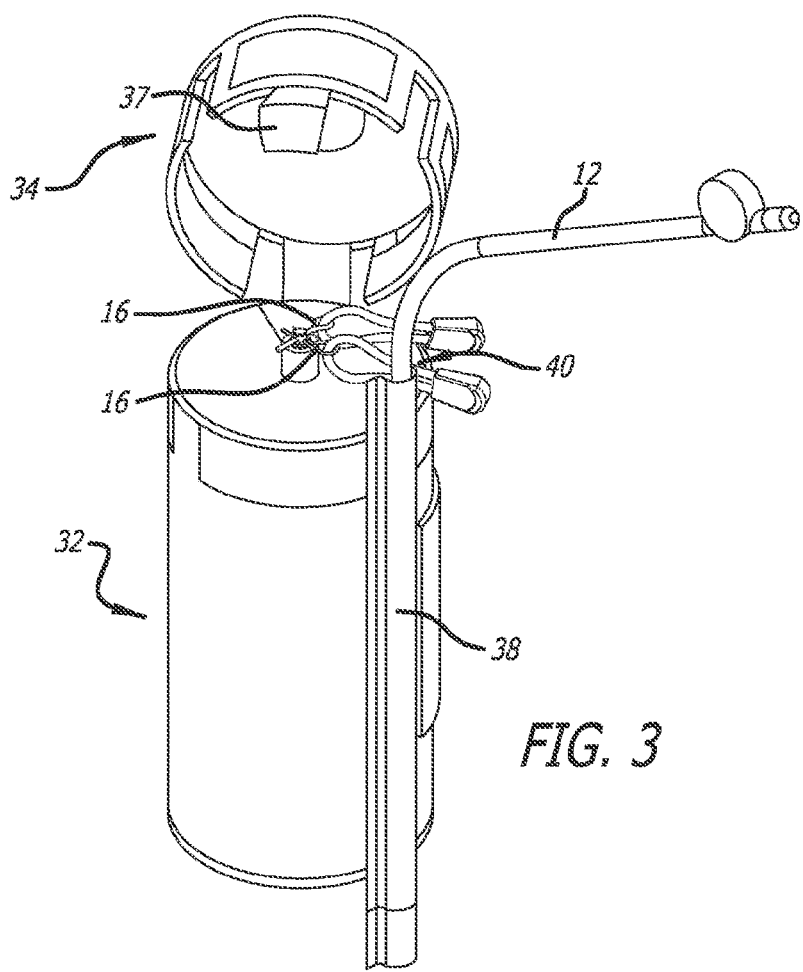

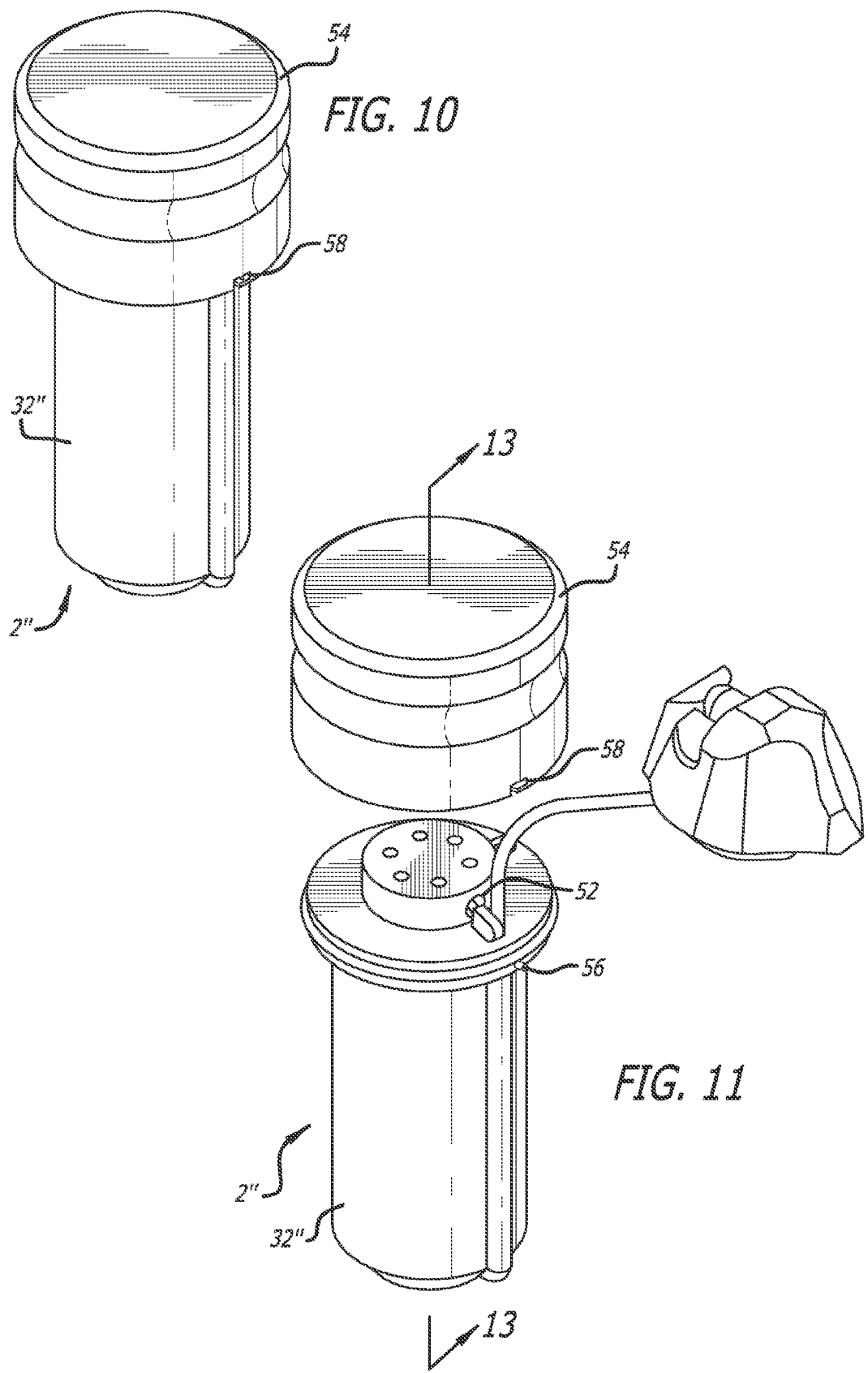

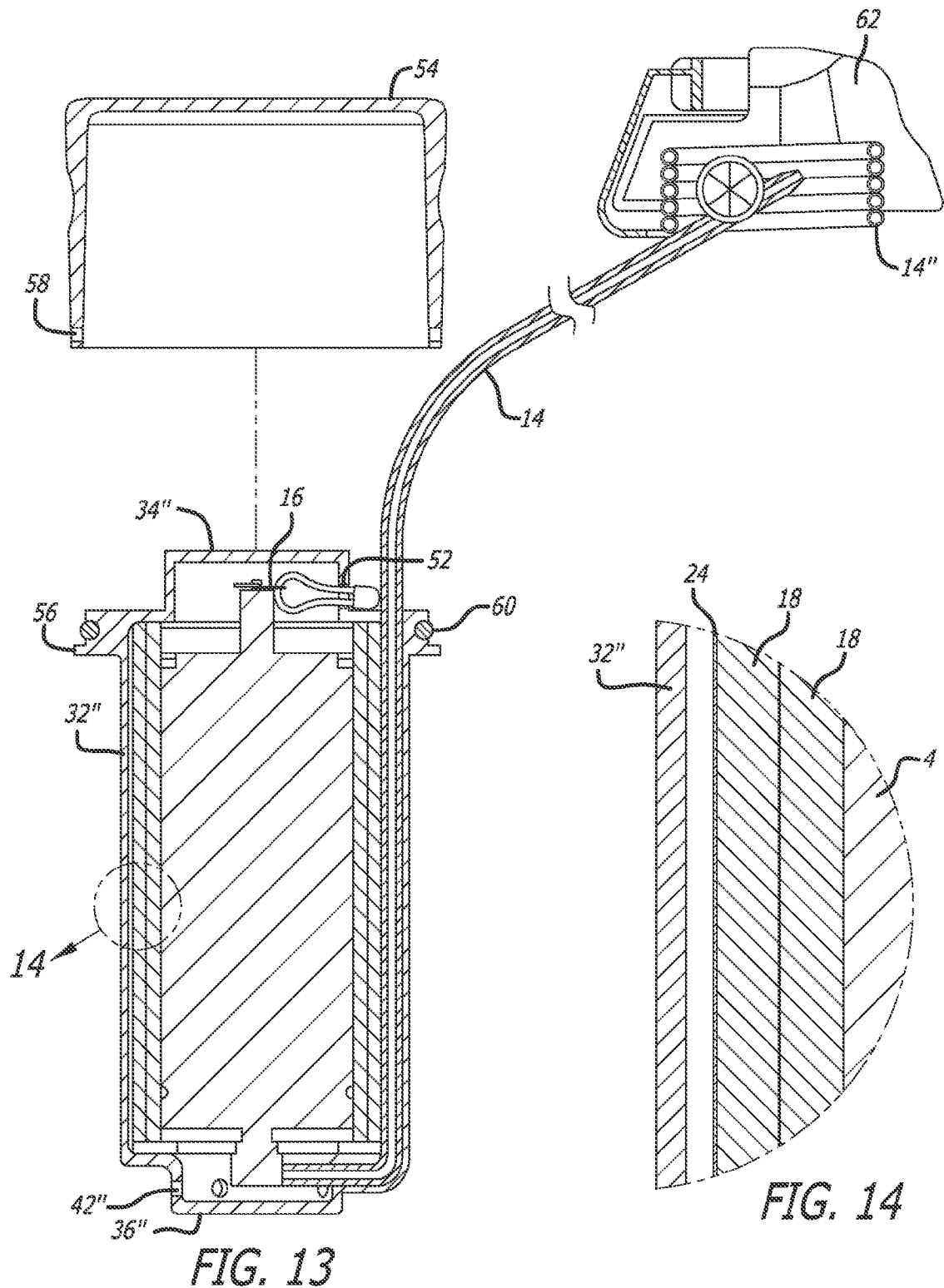

HANDHELD PORTABLE OXYGEN GENERATOR FOR USE IN EXTREME ENVIRONMENTS

RELATED APPLICATIONS

The present application claims priority to U.S. Provisional Application No. 61/570,926, filed Dec. 15, 2011, titled "Handheld Portable Oxygen Generator for Use in Extreme Environments," which is incorporated herein by reference in its entirety.

FIELD OF THE INVENTION

The present invention is directed to oxygen generators. More particularly, the invention relates to oxygen generators that are handheld and portable for use in extreme environments. The invention further relates to insulation of a long duration, high flow rate oxygen source for safe use in extreme conditions or emergency situations as a handheld device.

BACKGROUND OF THE INVENTION

Professionals operating under extreme conditions may find themselves in life threatening situations or even critical situations as part of their task. For example, soldiers in combat may be attacked and face injury from explosions, shrapnel, bullets, Improvised Explosive Devices (IED), and many other sources. The medical supplies offered at the point of injury within seconds or minutes of the injury are very limited, and generally not available. Instead, desired medical supplies are not available until an injured soldier is evacuated from the hostile location, which may not be for an extended period of time. However, administering certain medical assistance at the time of injury may save a patient's life, generally referred to as the "golden hour" by doctors. Other long term conditions may also be avoided such as those associated with traumatic brain injury (TBI). Other professionals within the military, search and rescue, first responders, homeland security, disaster relief and other humanitarian efforts may require the same need for transportable critical care supplies. Other non-emergency professionals may require immediate sources of oxygen, such as those that work in remote locations, including those of the oil and gas industry, researchers, mining, etc. Even recreational activities, such as mountain climbing or SCUBA diving, may put a person in a remote, and/or extreme environment requiring readily available, immediate medical supplies.

Serious and life-threatening medical emergencies will often cause oxygen to be depleted in the body creating a risk of cardiac arrest or brain damage. Therefore, oxygen is generally administered in emergency situations to prevent hypoxia, and other conditions. At a minimum, administering oxygen at the time of injury can greatly reduce the effects of shock usually accompanying an extreme medical emergency. Depleted oxygen conditions may also be present in extreme environments, such as high elevation, where the administration of oxygen may assist a person in reducing the effects of hypoxia, overcoming hypoxia, or enhance performance in the task executed in high elevation, or diminish and prevent other altitude related problems.

However, obtaining a sufficient oxygen supply within minutes of injury in remote locations, extreme conditions, and/or exceptional circumstances (such as battlefield conditions or remote mountain locations) is extremely difficult. The oxygen source must be brought safely to an injured person in a remote or hostile environment. Therefore, the oxygen source must be lightweight, transportable, and safe to carry and administer under extreme conditions and environments. Oxygen must be administered within a minimal amount of time under stressful conditions, with minimal preparation and easy activation. Oxygen must also be administered at a sufficient rate to start having any effect on the patient. Flow rates over 4 liters per minute (LPM) are necessary to have any beneficial medical impact on a patient, while 6 LPM or more are desired, and 8 LPM or more are preferred. The emergency conditions requiring oxygen administration may be spontaneous requiring oxygen to be administered immediately with little or no preparation of the dispensing device. However, the emergency condition may not occur at regular intervals, thus requiring the storage and transportation of the dispensing device for an extended period of time. Given the spontaneity of most situations or the potential remoteness of the storage and use locations, limited and no maintenance is desired.

The prior art recognizes a number of oxygen generators, including those as described in the following U.S. patents: U.S. Pat. No. 4,671,270; U.S. Pat. No. 4,342,725; U.S. Pat. No. 3,955,931; U.S. Pat. No. 5,750,077; U.S. Pat. No. 5,620,664; U.S. Pat. No. 7,371,350; U.S. Pat. No. 3,742,683; U.S. Pat. No. 3,868,225; U.S. Pat. No. 2,558,756; U.S. Pat. No. 3,565,068; and U.S. Pat. No. 3,580,250. However, these generators do not provide a sufficiently lightweight, handheld, portable solution to oxygen generation.

The ultimate challenge with chemical oxygen generators is that the reaction producing the oxygen is exothermic, and the external temperature of the canister containing the generator can reach temperatures as high as 500-600 degrees Fahrenheit (° F.) (260-316 C). Once the reaction is initiated, it cannot be stopped until the reactant is depleted. The longer the reaction lasts and possibly an extended time thereafter, the exterior temperature of the oxygen generator will continue to rise to a maximum temperature. Accordingly, even if some of the prior art publications provide solutions to portable oxygen generators, there are no products for truly handheld generators where the outside temperature is not of critical concern when in direct contact with the skin. Specifically, there are no solutions for providing a handheld long duration generator for oxygen production at high flow rates for rugged use in harsh environments and/or varied conditions.

Problems arise in insulating a canister containing the chemical reactants to produce oxygen, such that it is not an easy task to merely insulate an existing canister. Any additional material to insulate the canister must itself withstand the temperatures of the reaction and will add weight and bulk to the oxygen dispensing system. Therefore, it is easy to surpass the weight and/or dimensions of a generator that would be easily handled and transported. Insulating the exothermic reaction also traps the heat in the reaction area so that the temperature continues to increase to unacceptable levels. The increased temperature will increase the reaction rate of the chemical reactants and accelerate the generation of oxygen. Therefore, it is difficult to control the flow rate and provide an extended flow oxygen generator of sufficient flow rate under these conditions.

Known oxygen generation sources do not provide the combination of a safe, lightweight, transportable, reliable, maintenance free solution to medical grade oxygen generation of 99% oxygen by volume for use in extreme environments or harsh climatic conditions that is easily triggered under stressful conditions and operated in any orientation. They may require regular refilling, such as gaseous and liquid oxygen applications. Others require electricity and/or batteries that may not be available or reliable for an extended period of time. Others still may require mixing that increases the time until oxygen is administered and may prevent the device from being used at all if the environment is hostile and does not permit the requisite preparation conditions, operation temperatures, or operation orientations. Other problems encountered by the prior art oxygen generators include the unavailability in extreme conditions, such as severe dust storm, heavy rain, freezing conditions, snow, extreme desert heat, or high altitude. The devices may also have to operate in a given orientation, have limited shelf life, are too big and/or heavy for transport to remote locations, require logistical support, risk explosion, provide insufficient flow, or are not capable of clearing the Federal Drug Administration requirements for use.

SUMMARY OF THE INVENTION

The present invention relates to an oxygen source that supplies a long duration sufficient high flow of oxygen. Embodiments of the invention may be handheld and portable to extreme environments and/or locations to safely supply oxygen to a person within seconds of necessity.

The oxygen generation system according to embodiments as described herein includes a chemical oxygen generator that creates oxygen through an exothermic chemical reaction. The exothermic chemical reaction produces sufficient heat that contact with the generator container would cause unacceptable injury to a user. Accordingly, the oxygen generation system according to embodiments herein provides a containment layer to provide safer administration of the oxygen unit. The oxygen generation system may be handheld and portable for use in extreme, remote, and/or hostile conditions, locations, environments, and situations with a simple activation method easily operated under stress without any preparation or maintenance. Since the oxygen system does not require maintenance, the oxygen generation system may be used as a grab and go solution to medical emergencies.

Embodiments as described herein use a containment layer to shield a user from the heat generated by the chemical generator. The containment layer may include an insulation layer, a barrier layer, and/or an outer layer. These layers may be comprised of sub-layers or may be combined to provide dual purpose layers. In an exemplary embodiment, the insulation layer comprises an silica aerogel material. Because of the irritation cause by the aerogel, the barrier layer is used to contain the aerogel dust and protect the aerogel to prolong the insulation capabilities of the material. The outer layer may provide additional protection from storage, transport, and external conditions. The insulation layer may additionally or alternatively comprise a low density elastomer, or low density elastomeric fire and thermal barrier. In this case, the barrier layer may be present to protect the insulation layer from the environment.

BRIEF DESCRIPTION OF THE DRAWINGS

FIG. 2 illustrates the exterior side view of an exemplary embodiment of an oxygen generation system according to embodiments as described herein;

FIG. 3 illustrates a perspective view of an exemplary embodiment of an oxygen generation system according to embodiments as described herein with the end cap open to expose the activation mechanism;

FIG. 10 illustrates a perspective view of an exemplary embodiment of an oxygen generation system according to embodiments as described herein, including a hard exterior housing;

FIG. 11 illustrates a perspective view of the exemplary embodiment of FIG. 10 with an end cap removed and interior exposed, including the contained face mask and extension hose;

FIG. 13 illustrates a cut away profile view of the exemplary embodiment of FIG. 11 as indicated along line 13-13; and FIG. 14 illustrates a magnified sectional view of a portion of the side wall of the exemplary embodiment as indicated in FIG. 13.

The following detailed description illustrates by way of example, not by way of limitation, the principles of the invention. This description will clearly enable one skilled in the art to make and use the invention, and describes several embodiments, adaptations, variations, alternatives and uses of the invention, including what is presently believed to be the best mode of carrying out the invention. It should be understood that the drawings are diagrammatic and schematic representations of exemplary embodiments of the invention, and are not limiting of the present invention nor are they necessarily drawn to scale.

DESCRIPTION OF THE INVENTION

Definitions

By "prolonged period of oxygen production" is meant oxygen production for over 15 minutes, and preferably over 18 minutes.

By "extended period of oxygen production" is meant oxygen production for over 20 minutes, preferably 22 minutes, most preferably 50 or 60 minutes.

By "adequate oxygen supply" is meant at least 4 liters per minute.

By "sufficient oxygen supply" is meant an average flow rate of at least 6 liters per minutes and more preferably at least 8 liters per minute during the flow duration.

By "aviation grade oxygen generator" is meant chemical oxygen generator having a shelf life of 15 years or more, and flow rates of medically pure oxygen of at least 99% oxygen by volume for altitudes up to 40,000 feet of at least 2.8 liters per minute (LPM), 3.6 LPM, 6.6 LPM, 8 LPM, or more for at least 12, 15, 22, 36, or more minutes.

By "handheld" is meant capable of being held and transported by one hand, while administration of the device may require two hands.

Flow rates are provided as mass flow rates in normal temperature and pressure dry conditions.

DESCRIPTION

Chemical oxygen generation is currently in use for emergency oxygen supplies for military and civilian aircraft. There are also disclosures for carrying a non-pressurized oxygen solution, however none of these solutions allow the user to actually hold the device in hand while using it, or operate in rugged and harsh environments or extreme conditions. The temperatures of the existing devices rise too high and the device needs to be positioned on the ground, or otherwise away from the body when using it. The difficulty in developing a truly handheld device is that the higher the oxygen flow rate and the longer the duration of the oxygen flow, the higher the temperature rises. One solution is to build larger and bulkier devices with thick insulation, but then the concept of portability is destroyed as the device becomes too big and heavy. Another solution would be to provide only short term oxygen flow, lower output flow, or a combination of both, but these solutions would not be useful for various purposes, including emergency medical situations.

Figure 1:
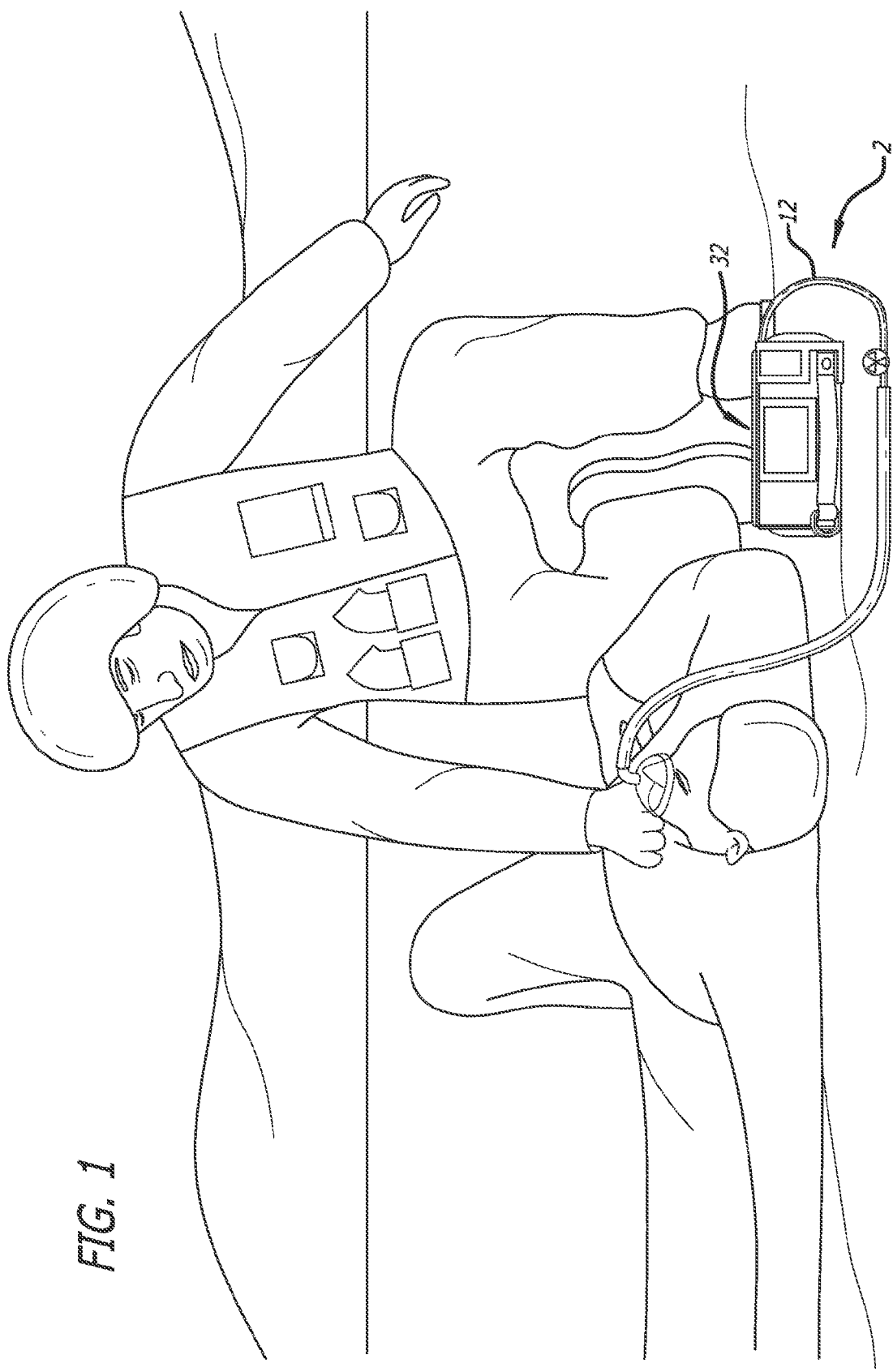
FIG. 1 illustrates an exemplary embodiment of an oxygen generation system according to embodiments as described herein in use in a hostile environment.

FIG. 1 illustrates an exemplary handheld oxygen source 2 according to embodiments of the present invention. The system comprises a chemical reactant within a container. The system also includes a containment layer that prevents the heat from the exothermic reaction of the chemical generator from reaching a user. The system includes an igniter to initiate the chemical reaction and an exit port and/or hose to provide a flow path for the oxygen generated from the chemical reaction. Other connectors, hoses, indicators, masks, cannulas, etc. may also be included with the system.

The chemical generator uses a reactant to produce oxygen in a chemical reaction. A reactant is contained within the compartment of the generator. Once ignited, the chemical reaction is exothermic and therefore maintains the reaction until the reactant is depleted. However, once activated the reaction cannot usually be stopped.

In an exemplary embodiment, an igniter is positioned at one end of the container to ignite the reactant from one end. The reactant may be composed to control the production of oxygen through its composition, configuration, density, etc. Since the reaction will occur from the ignited end of the reactant to the opposing end, the reactant may be varied along its length to control the oxygen production during the reaction process. For example, the reactant may be configured to produce a constant flow rate of approximately 4 LPM to 10 LPM, and preferably approximately 6 LPM to 8 LPM, over the duration of the flow. Alternatively, the reactant may be configured to produce an initial increased flow rate of approximately 6 LPM to 12 LPM, preferably approximately 6 LPM to 10 LPM, and more preferably approximately 8 LPM and a reduced flow rate toward the end of administration at approximately 4 to 10 LPM or 4 LPM to 8 LPM, and preferably approximately 5 LPM to 6 LPM, with an average flow of approximately 6 LPM or more. As used here, "configured" includes modifying the composition, arrangement, density, configuration, shape, size, or other attributes of the reactant(s) and/or container to control the reaction rate of the oxygen production.

As shown, the reactant may be composed of an aggregate chemical composite in compact forms such as disks, pellets, etc., positioned within the compartment. Because the reaction cannot generally be controlled once initiated, the composite material may be selected to generate a desired oxygen production at the time an individual disk is consumed. For example, a higher oxygen generation rate may be desired initially to help a patient overcome the initial effects of the injury, or other oxygen causing event. Variable reactant composition, configuration, and/or density may be used to provide an even flow rate as well. Since the heat on the interior of the container may increase during the reaction, the overall reaction rate may accelerate and produce a higher flow rate at the expense of flow duration. Therefore, the composite material may be configured to produce less oxygen toward the end of administration to correspond to the increased reaction rate of the individual disk.

In an exemplary embodiment, a higher density (more compact) reactant may be used to produce more oxygen as more of the reactant is consumed faster by the chemical reaction. Therefore, the density and order of reactant sections may be selected for a sequentially desired flow rate. For the above example, reactant configurations of higher density may be positioned near the igniter while lower density configurations may be positioned toward the opposing end. Any combination of reactant configurations may be chosen to produce a desired oxygen production profile. The reactant may be in the form of stacked disks, packed pellets, or a generally integrated core within the interior of the container. The core may be shaped or configured by modifying the density of the material, such as including gaps or spaces within the core material to provide the desired and/or variable flow rates. In an exemplary embodiment, the core is a generally solid body filling the interior chamber with openings and/or holes throughout the core material. The openings/holes are positioned either uniformly or variably to control the reaction rate of the reactant and dissipate heat. In an alternative embodiment, filler materials may be used to reduce the reaction rate of the reactant and control the production of oxygen. The composite materials may also be selected and/or configured to contain the heat from the reaction, and/or filter the produced gas to provide an output oxygen of sufficient quality.

In an exemplary embodiment, sodium chlorate is ignited to produce oxygen in an exothermic reaction reaching 600° F. (316 C) or more. The heated sodium chlorate decomposes into sodium chloride (salt) and oxygen gas. In the presence of water, chlorine gas and hypochlorite ions are also produced. Chlorine gas, which is toxic, then needs to be removed from the resulting gas. Disodium peroxide may be used to scavenge the chlorine gas and hypochlorite ions. The chemicals may be sealed by a membrane foil to prevent contamination. The generator may produce medical grade oxygen that is at least 97% pure by volume, and preferably at least 99% by volume pure oxygen. The produced product is odorless and colorless. The chemical reactions may include:

Fundamental Reaction: $NaClO_3 \rightarrow NaCl + 3/2 O_2$;
Heat Generating Reaction: $Na_2O + \frac{1}{2}O_2 \rightarrow Na_2O_2 + heat$;
Chlorine Absorption Reaction: $Na_2O_2 + Cl_2 \rightarrow 2NaCl + O_2$.

Other chemical generators including other compositions may be used to produce usable oxygen. For example, different scrubbing materials or filler materials may be present. Different reactants may also be used to produce the oxygen. Exemplary embodiments as described herein include portable heat containment solutions to the exothermic reactions of chemical oxygen generators. Accordingly, embodiments may be used with any exothermic chemical oxygen generator.

An igniter is used to initiate the chemical reaction to produce oxygen. The igniter is an easily accessible mechanism outside of the container that produces the initial ignition of the reactant inside the container. For example, the igniter may be a pin, button, switch, or other starter that initiates a sufficient heat source on the interior of the container to ignite the reactant. The reactant does not require any preparation before initiating the oxygen flow and the mechanism provides an easy to manipulate initiation of the reaction. However, the starter mechanism may also prevent or reduce inadvertent ignition, as the reaction generally cannot be stopped once initiated. Therefore, a safety pin, cap, stopper, or other feature may be included in addition to or in combination with the igniter to reduce the inadvertent ignition of the reaction. In an exemplary embodiment, the igniter, safety starter, and reactant ignition may be configured so that oxygen can be available to a user within 20 seconds, and preferably within 10 seconds, and more preferably within 5 seconds of activation.

In an exemplary embodiment, the igniter is a spring-powered striker retained by a pull pin. An activation pin on the exterior of the container holds the igniter in place with the spring extended. Once the pin is removed, the striker is propelled under spring power to contact a striking surface and ignite the reactant. A safety pin may also be included as a redundant activation pin to reduce the likelihood of accidental activation during transportation and/or storage. No activation time is required to prepare the reactants or initiate the reaction beyond igniting the reactants by pulling one or more pins. Therefore, oxygen may be available to a user within approximately four seconds after actuation.

The container may also include a relief valve to prevent the pressure from building up within the container once the reaction is started. To enhance safe use, it will act as a pressure relief device (PRD). Therefore, in the event the output port is blocked, the pressure cannot critically build within the container.

Because the oxygen generation is an exothermic reaction, the temperature within the container may reach and exceed 600° F. (316 C). This heat is dissipated through the exterior wall of the container; making the container too hot to physically contact. Therefore, an insulation layer is provided around the exterior of the container to reduce the exterior temperature and permit the handling of the device during oxygen administration. While the interior of the chamber may reach temperature of 600° F. (316 C) or more, the exterior temperature of the system should not generally exceed approximately 186° F. (86 C) over the entire device. Preferably, the exposed, contactable exterior of the device remains at or below approximately 149° F. (65 C) and more preferably at or below approximately 113° F. (45 C), over a substantial portion or the entire exposed exterior to permit safe handling under precaution. In an exemplary embodiment, a substantial portion of the exterior surface may be maintained at or below a desired temperature, so that the system can be handled (with care) during use. However, in a preferred embodiment, the entire exterior surface is protected and maintains the contactable, exposed exterior surface at or below a desired temperature to prevent and/or reduce the potential for accidental burns. A "substantial" protected portion is understood to include either an entire designated contactable region that is at least a majority of the exposed, contactable exterior surface, or any combination of exterior surfaces that includes at least 80% and more preferably at least 95% of the exposed, contactable exterior surface. For example, for a generally cylindrical container, the exterior curved surfaces may be protected to provide the contactable surface, while the heat is localized at or near one of the flat ends. In this way, a user is provided sufficient surface area to handle the container with care, avoiding the localized hot spot or zone.

Because embodiments of the present invention may be used in extreme conditions and situations, including high elevation, extreme cold and hot environments, and hostile conditions including fire, explosion, IED, landmine blast, and gun fire, the exterior of the container may also include additional layers of protection. The device may also be carried, stored, or transported under rudimentary conditions involving high vibrations and/or shock also necessitating additional protection. For example, an exterior material or coating may include a fire retardant or water resistant or resilient substance. The materials used may also be designed to reduce the impact of vibration, collision, blast, or other trauma. In an exemplary embodiment, the case may include a pliable material to act as an impact/vibration absorption. In alternatively embodiments, a hard shell may be used to address different environmental concerns.

However, whatever combination of insulation and protection added to the system to reduce and/or prevent the potential for burns during the administration of oxygen will increase the size and weight of the overall system. Preferably, the system is handheld so that it can be easily used and transported to remote environments where traditional oxygen sources are not readily available. Therefore, the entire system, including any insulation and protection layers, is equal or less than approximately 4 pounds (1.8 kg), preferably 3.5 pounds (1.6 kg), more preferably 3 pounds (1.4 kg), or 2.5 pounds (1.2 kg). The overall system should also be kept small so that it can easily fit within an emergency medical kit that is carried, or within a backpack or other rugged means of handling that is taken with a user to a remote location and administered at the place of injury. In a preferred embodiment, the system is under 10 inches (25.4 cm) in any dimension. In an exemplary embodiment, for easy handling, the outer dimension is a rectangular cube, cylinder, or other ergonomically convenient shape with a dimension of approximately 5 inches (12.7 cm) and more preferably approximately 4 inches (10.2 cm) or less so that the system can be grasped, held, and transported in one hand.

The oxygen generation system may include a containment layer around the generator. For example, the oxygen generation container may be surrounded by at least one layer of insulation to reduce the temperature experience at an external surface of the system. The insulation should keep the temperature of the exterior surface of the insulation at or below approximately 186° F. (86 C), preferably approximately 149° F. (65 C), and more preferably approximately 113° F. (45 C). The oxygen generation container may also be protected by additional and/or alternate layers of insulation. For example, a second material different from the first material may be used as an additional insulation that includes other properties, such as flame retardant or blast/impact protection. Tape, shrink tubing, clasps, or pre-formed molding processes may be used singularly or in combination to retain the one or more layers around the oxygen generation container. An outer covering may also be used to contain the other insulation layers. The outer layer may provide alternative and/or additional insulation while providing exterior protection from the elements and environment, including rain, dust, snow, etc. The outer layer may also include handles, hooks, connectors, snaps, tabs, windows, labels, or other features to permit the easy use, transport, handling, and identification of the system. However, to keep the system easily transportable, and/or handheld, the outside layers should be kept to a minimum. To obtain a desired overall size of the system, the containment layer may be no more than approximately 1 inch (2.5 cm)

thick, preferably no more than 0.75 inches (1.9 cm) thick, and more preferably no more than 0.5 inches (1.3 cm) thick.

The insulating layers may be singly or multiply wrapped sheet(s) around the oxygen generation container, preformed shaped outer coverings, or otherwise configured around the oxygen generation container. The manufacturing process may be improved though the use of a hard shelled layered system, where the shell can be integrally formed with one or more desired material layers and/or a part of the generator construction. Alternatively, a soft or pliant material combination may be used to improve vibration or impact resistance.

In a preferred embodiment, a first insulation section is a single or double layer of silica aerogel, such as Pyrogel®XT, or a synthetic vitreous fiber material. Silica aerogel possesses the lowest thermal conductivity of any known solid. However, silica aerogels are known to generate excessive amounts of dust that causes irritation of the eyes, skins and mucous membranes. Therefore, use of silica aerogel to insulate an oxygen generation device for human use is not obvious. The use of the aerogel by itself would cause excessive irritation as any handling of the device would create a aerogel dust area surrounding the device. The reduction of aerogel powder through the loss of aerogel dust also adversely affects the thermal resistance provided by the insulation layer.

A barrier layer may be used to contain the aerogel dust, and protect the aerogel from any outside contamination, such as dust, moisture, etc., so that the aerogel maintains its insulation properties over an extended period of time and handling, while protecting a user from irritation. The barrier layer may also provide other protection to the device. For example, the material may provide additional insulation and/or flame, water, salt, sand, vibration, impact, blast, shot, etc. protection. The barrier layer may include one or more layers that also assist in retaining the various materials together and/or minimizing the exterior dimension of the system including the containment layer. For example, a fiberglass layer, foil tape, shrink tubing, or any combination thereof may be used as a barrier between the aerogel and the environment and its associated elements. Shrink tubing may also be used in conjunction or alone to retain the insulation layers and reduce the overall dimension of the insulation layers. Clasps, clamps or other binders/retainers may additionally or alternatively be used to retain the insulation and/or barrier layers in the desired configuration.

The insulation layer and/or barrier layer may surround the oxygen generator container with an outlet for the oxygen tube and another for the igniter activation portion to pass. Separate insulation or protection layers may be formed around these components.

The system may then be enclosed in an outer layer or container, to provide exterior protection from the environment and/or elements. The outer layer may be a pliant material, such as a bag, to provide additional vibration and shock protection. For example, the outer layer may be of Vinyl, Nylon, Kevlar®, Nomex®, or some combination thereof. Alternatively, the outer layer may be a hard shell to provide the barrier between the insulation layer and the environment. For example, the outer layer may be of an aluminum foil and/or low density elastomer based material such as Fastblock®300 material composite.

The containment layer may be separately formed by individual layers, such as the described wrapped materials. Alternatively, one or more materials of the one or more layers may be integrally formed. For example, one or more of the insulation materials may be molded in a low density elastomer, or low density elastomeric fire and thermal barrier to integrally form the insulation layer with the barrier layer and/or the outer layer. The integrated layers can be used to isolate the insulation material from users and the environment to reduce irritation, and extend the thermal protection provided by the insulation. The resulting hard shell can provide additional heat protection and environmental protection for the entire generator. In an exemplary embodiment, Fastblock® manufactured by Esterline Engineered Materials is used in combination with the Pyrogel®XT to form an insulating/barrier composite.

The containment layer or any portion thereof, including the outer layer and/or barrier layer and/or insulation layer, may also include openings, or a separate material such as webbing, or mesh, to provide a breathable heat exchange area for the captured heat of the oxygen generator to escape. The layers may be integrally formed, or may be separately layered. The layers may be used in any combination or sub-combination. Specific exemplary embodiments are provided below, but are not intended to be limiting. Different combinations of the above described layers including an insulation layer, barrier layer, and outer layer are provided. These layers may themselves comprise one or more layers. Alternately, the identified insulation, barrier, and outer layers may be combined and/or consolidated into a fewer layers, while still providing the purpose of the identified layer. For example, composite materials, single materials performing the multiple functions, or multiple materials combined, interwoven, molded, integrally formed, etc. may be used. As any additional material is added at the expense of size and weight, any one or more of the layers may also be removed if the desired function is not sufficiently desired for the weight/size trade-off. Accordingly, it is understood that the below described specific embodiments are not limiting and any combination, sub-combination, re-combination including additional or fewer layers are encompassed within the scope of the present invention.

Embodiments of the oxygen generation assembly provide a desired flow rate for a desired flow duration, while maintaining a desired exterior temperature along a substantial outer surface of the assembly. The assembly is safe for handheld user (with care) for outside temperatures from −4° F. to +155° F. (−20 C-+68 C). The assembly provides an exterior temperature along a substantial portion of the outer surface under at least 186° F. (86 C), 149° F. (65 C), or 113° F. (45 C), while the exit temperature of the oxygen administered to a user is between approximately ambient temperature and +11° F. (6 C) above ambient. The entire assembly is preferably handheld and weighs approximately 4, 3.5, 3, or 2.5 pounds (1.8, 1.6, 1.4, 1.1 kg) or less and has at least one dimension of approximately 5, 4, or 3 inches (12.7, 10.2, 7.6 cm) or less. To provide a transportable device, the overall dimension of the assembly should be less than 10 inches (25.4 cm). The assembly preferably provides a protection layer ratio to small dimension of 10 to 30% and preferably 12 to 25%; ratio of protection layer to flow duration of approximately 0.01 to 0.06 and preferably approximately 0.01 to 0.045 (in/min); and ratio of protection layer to oxygen volume generated of approximately 0.002 to 0.01, and preferably 0.0035 to 0.008 (in/L).

An exit hose may be used to take the produced oxygen from the interior of the container to a user. The oxygen at the user interface should be at a temperature sufficiently cool to permit direct administration to a patient. Therefore, preferably, the temperature at the patient interface of the gas flow is within approximately 15° F. (8 C), and more preferably within approximately 12.5° F. (7 C), and more preferably within approximately 11° F. (6 C) of the ambient temperature. However, the material must be constructed to withstand the high exit temperature of the gas from the oxygen generator. The material must also not irritate the skin or other membrane of a user, as the tubing may be directly inserted into or otherwise directly contact a user. In an exemplary embodiment, the exit hose comprises silicone. The exit hose may include its own protective layer and/or insulation along its length, such as Nylon or Kevlar®. The exit hose may also include a flow indicator to show when the reaction has initiated and cease to confirm oxygen is flowing to a user. The exit hose, exit port, or oxygen generator may also include a flow regulator to control the flow rate of the produced oxygen.

To reach higher flow rates than provided by a single oxygen generator as described herein, multiple generators may be combined together to add the various flow rates. Therefore, rates of 10 LPM to 15 LPM or more, desired for ventilators and other support equipment, may be obtained by combining two or more generators as described herein. Therefore, connectors may be used to connect generator exit ports or output hoses of more than one individual generator and combine into a single flow output to create a higher single flow rate. According to one preferred embodiment, a kit comprising a multitude of oxygen generator assemblies are packed in groups. Therefore, 2, 4, 6 8, or any desired combination of generators may be packed together as a group along with one or more connectors to conveniently and easily combine two or more of the grouped assemblies together. The generators may be use individually as needed, or two or more generators may be combined to increase the flow rate, or otherwise combined to replace or add generators as necessary.

Alternatively, for uses requiring lower flow rate (such as for comfort, enhancement, or non-trauma conditions), a single generator may be divided into multiple application hoses to supply a lower rate oxygen to more users. For example, in high altitude applications in which a user just requires the presence of more oxygen to improve efficiency and physical performance, a single container may be used to supply oxygen to two or more users by providing a divider at the generator exit port or exit hose to permit connection of two or more separate generator assemblies.

Single connectors to simply extend a single application hose may also be used. The hose may be extended to permit a longer flow path to provide an opportunity for the exit gas to exit closer to the ambient temperature or to provide a longer working distance between the oxygen generator and the patient. The system may also include additional connectors, hoses, and/or interfaces. For example, the system may include a connector to permit the exit hose to connect to a face mask or cannula to provide convenient administration to a patient. According to one embodiment the device has a hose with a flow indicator where the user can plug in his/her own mask. This feature makes the device not limited to a specific patient interface, but available for use with a diversity of flow masks and patient oxygen administration interfaces. According to another embodiment, the patient interface is an integral part of the device.

FIGS. 2-7 illustrate an exemplary embodiment of a handheld oxygen generation system 2 according to the invention comprising an oxygen generator container 4 enclosing a chemical core, an activation device 6, a containment layer 8 and an oxygen outlet 10. Oxygen is produced by chemical reaction initiated by the activation device to produce oxygen out the oxygen outlet. The chemical core is a reactant that produces oxygen in an exothermic chemical reaction. In a preferred embodiment, the reactant is sodium chlorate.

Figure 4:
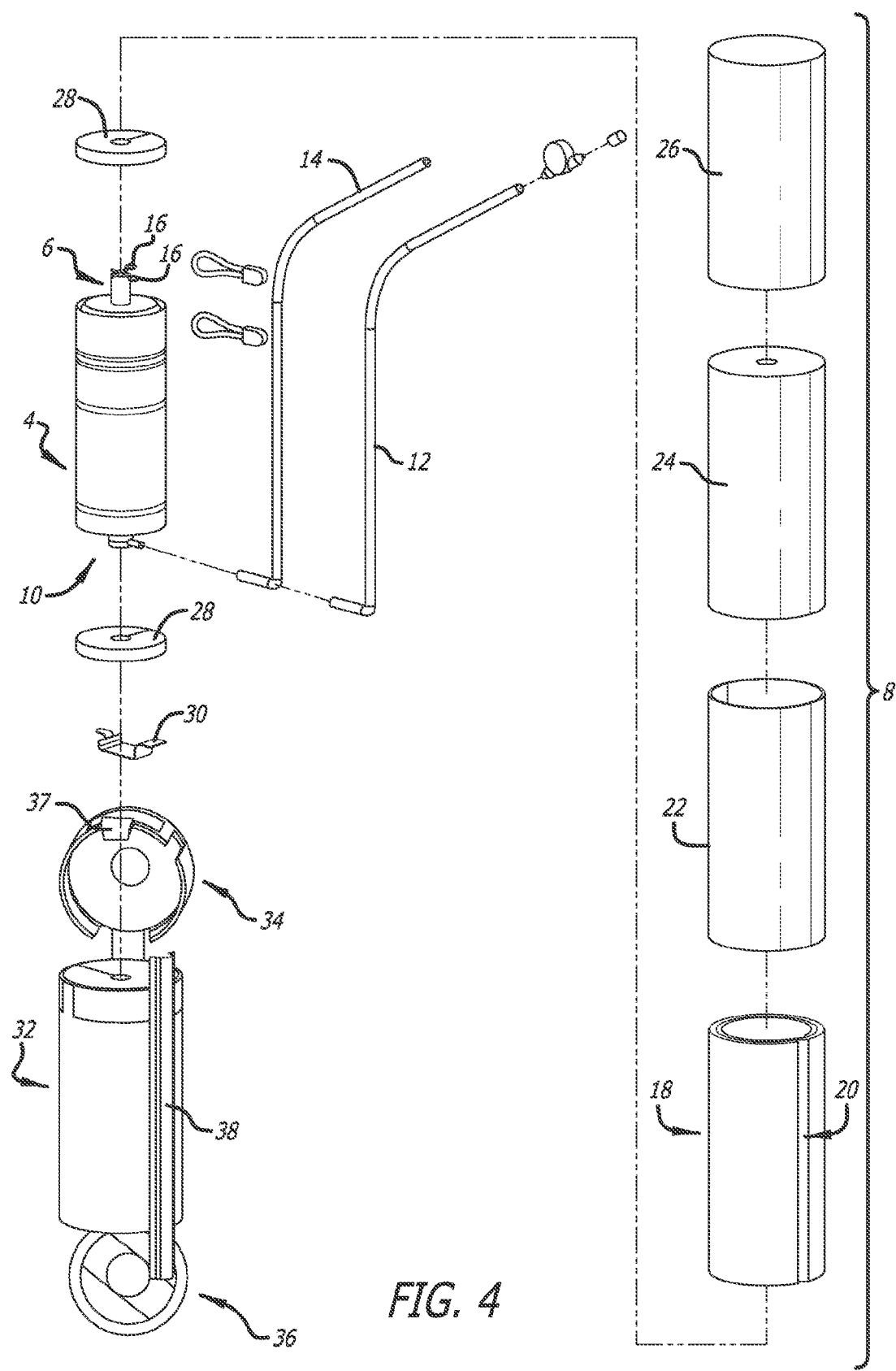
FIG. 4 illustrates an exploded perspective of the various layers and components of an exemplary embodiment of an oxygen generation system according to embodiments as described herein.
Figure 5:
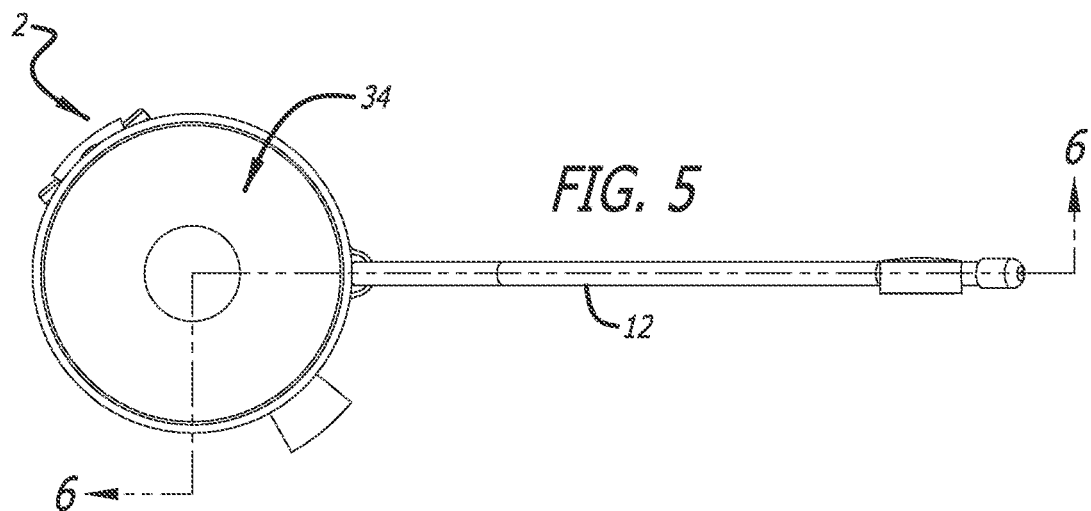
FIG. 5 illustrates a top view of an exemplary embodiment of an oxygen generation system according to embodiments as described herein.
Figure 7:
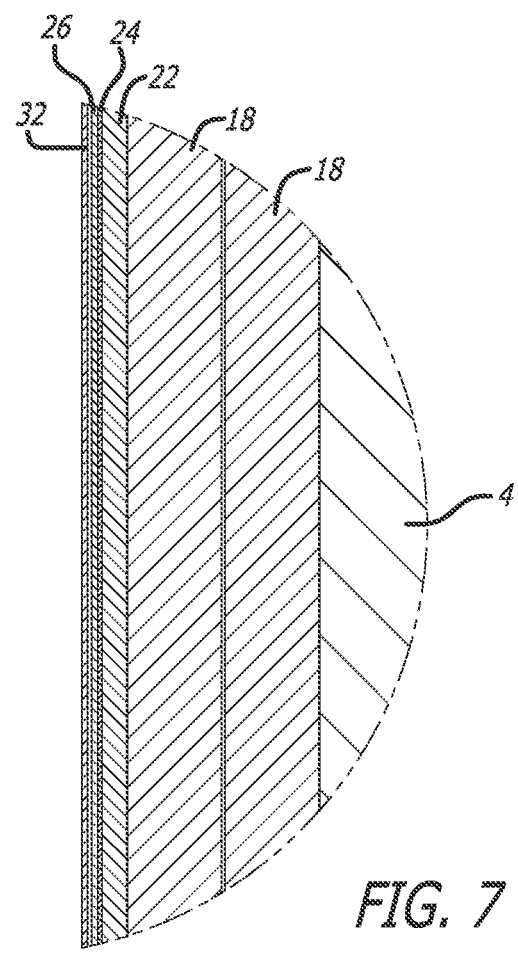
FIG. 7 illustrates a cut away magnified view of a portion identified in FIG. 6 of the side wall of the containment layer and exterior housing according to embodiments as described herein.
Figure 6:
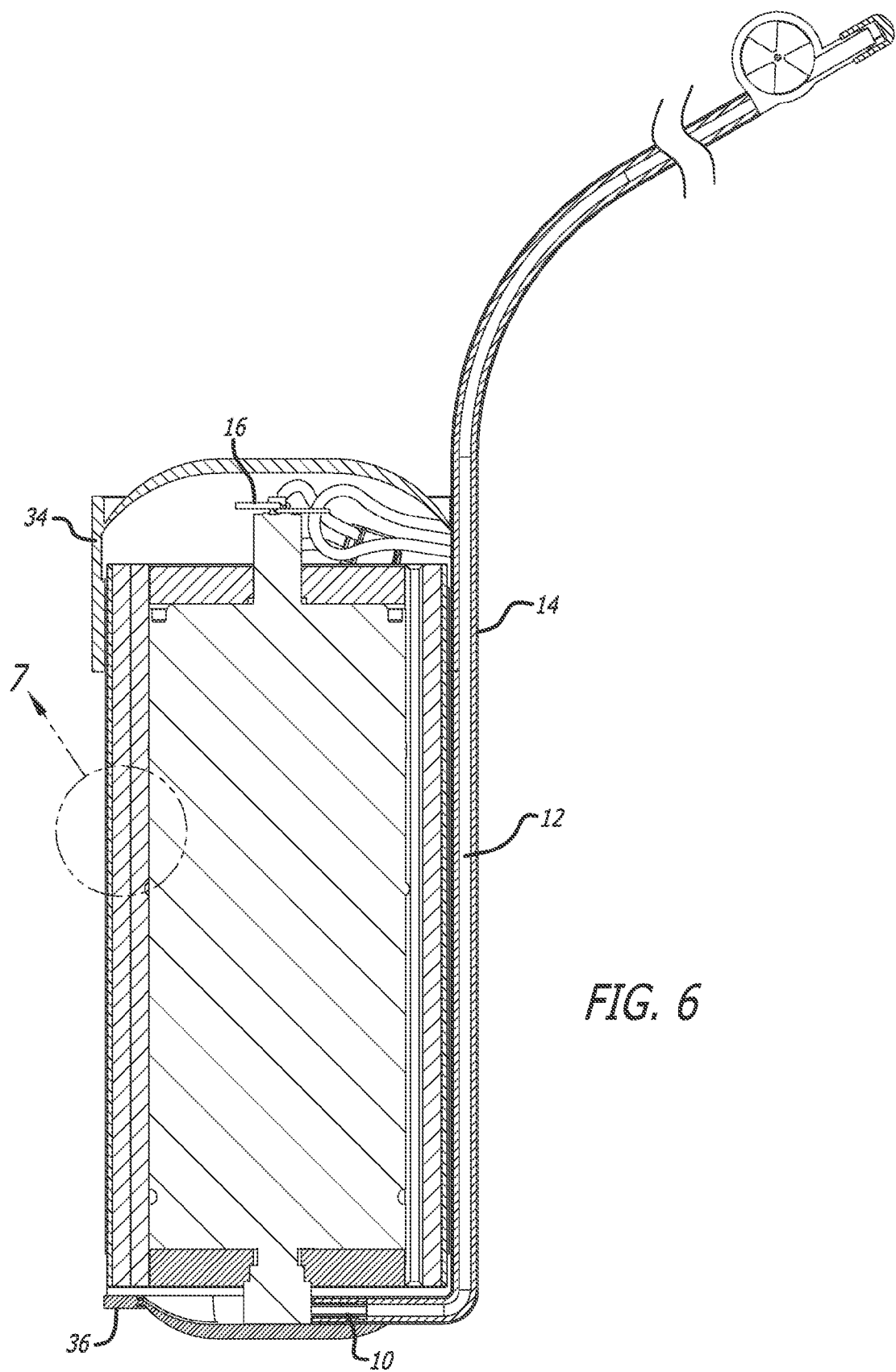
FIG. 6 illustrates a cut away profile view of an exemplary embodiment of an oxygen generation system according to embodiments as described herein along section 6-6 of FIG. 5.

The oxygen generator container 4 preferably has a water volume of approximately 0.6 to 1.6, and preferably 1 to 1.6 liters. To permit the system 2 to be handheld, at least one of the dimensions of the assembly including the container 4 and containment layer 8 is preferably approximately 5 inches or less and more preferably approximately 2-4 inches. Therefore, the container 4 has a dimension that is preferably approximately 4 inches or less, and more preferably approximately 1.5-4 inches. The container may be cuboid, such as a rectangular prism, cylindrical, or other shape to facilitate handling, storing, manufacturing, etc. The container 4 is made from a material that can withstand the pressure and temperature produced by the oxygen generating chemical reaction, while being inert to the reaction and lightweight. As shown in FIG. 4, the container 4 is generally cylindrical and is approximately 9+/−3 inches (22+/−7.6 cm) in height by 3+/−1.5 inches (6.3+/−3.8 cm) in diameter. The container is a metal canister of stainless steel, but may be any material to withstand over 600° F. (316 C) and 30 psig.

The container includes at least an oxygen outlet 10 to permit the oxygen generated within the container 4 to exit the container for use. As shown, one end of the container 4 includes an exit port that provides an oxygen flow path from the interior of the container to a user through a tube 12. The tube 12 must also be able to withstand the temperatures associated with oxygen generation as it contacts the outlet port and is flowing hot gas for the period of generation. Preferably the tube is flexible to facilitate oxygen administration to a patient. In an exemplary embodiment, the tubing is silicone. The tube may also include a protective sleeve 14 to provide insulation along its length and/or strength and protection along the length of the tube 12. As shown, the protective sleeve 14 may include a braided material that is flexible yet heat resistant. The sleeve may be Nylon or Kevlar® or other suitable protective layer. The tube 12 may also include a flow indicator to indicate when oxygen is flowing. For example, the flow indicator may be a chamber that intercepts the flow path of tube 12, enclosing a pinwheel that is spun by the passing gas through the tube 12. The moving pinwheel indicates when oxygen is flowing, and alerts a user when oxygen generation is ceased.

The container also includes an activation assembly 6. Preferably, as described above, the activation assembly may be an igniter at one end of the device to permit a desired oxygen flow profile by varying the linear composition of the chemical reactant from one end of the container 4 to the other. The activation assembly permits a user to initiate the chemical reaction contained within the container from an exterior of the container. In an exemplary embodiment, the activation assembly 6 includes a spring-powered striker that ignites the reactant. A release pin 16 is used to retain the spring in an engaged position, such that by pulling the release pin 16, the spring moves a firing pin that hits an igniter cap. This igniter cap activates the starter powder which causes the chlorate core to produce oxygen. A second release pin 16 may be included as a safety feature to ensure that the unintended or accidental initiation of the reaction is reduced or prevented. The one or more release pins 16 may be contoured to provide a clamped or frictional fit with an extension of the container that houses the activation assembly.

The handheld oxygen generator system 2 also includes a containment layer 8 surrounding the container. The containment layer protects a user from the 600° F. (316 C) reached by an exterior of the container during and/or after the generation of oxygen by the chemical reaction. The containment layer includes a silica aerogel sheet that is approximately 0.2 inches (0.5 cm) thick wrapped around a side wall of the container in a double thick layer. For example, the cylindrically curved exterior wall includes a double wrapped layer of silica aerogel sheet 18. The ends 20 of the aerogel sheet may be contoured to correspond to an inner and outer surface of the aerogel sheet respectively. Therefore, the wrapped sheet provides a generally uniform inner and outer surface. For example, the ends may be tapered to correspond to an angled transition of the sheet from an interior layer to an exterior layer of the wrapping. Alternatively, the sheet may be straight cut and transition from an inner layer to an outer layer from a first to second winding in a generally discontinuous radial direction. A single wrapped layer of 0.4 inches (1 cm) may alternatively be used.

The containment layer 8 may also include a fiberglass layer 22 of approximately 0.1 inches (0.25 cm) surrounding the aerogel layer 18. The fiberglass layer 22 is another sheet wrapped around the exterior cylindrical surface of the assembly including the container 4 and aerogel sheet 18. The assembly including the container 4, aerogel sheet 18, and fiberglass layer 22 are retained in place by foil tape 24. Finally, the container 4, aerogel sheet 18, fiberglass 22, and foil tape 24 are all retained by a shrink tubing 26 to retain the layers together and minimize the thickness of the entire containment layer 8. The containment layer 8 may also include 0.4 in disks or end regions 28 to cover the end surfaces of the container. The end sections 28 may include holes to pass the activation assembly and oxygen outlet. Additional layers may be included over the extreme ends of these parts, such as bracket 30 to act as a heat shield for a user's protection, or shock shield, for the component protection. The aerogel and fiberglass may alternatively be integrally molded through a low density elastomer or silicone for better insulation and/or manufacturing and aerogel dust containment.

An exemplary embodiment of the oxygen generation assembly provides an oxygen generator having a small diameter of 2.77 inches (7 cm), and a total outside protection layer of 0.5 inch (1.27 cm) along one side and therefore 1 inches (2.54 cm) total across the container. The oxygen generator container 4 preferably has a water volume of approximately 0.6 to 1.6 liters, while the entire assembly has a water volume of approximately 1 to 3 liters, and preferably 1.3 to 2 liters. The assembly may provide oxygen for a desired duration of a minimum of approximately 22 minutes and typically around 25 minutes at a rate of 4 LPM or 6 LPM minimum. The total oxygen volume generated is preferably at least 90 liters and more preferably approximately 132 liters at 99.5% purity by volume. Accordingly, embodiments as described herein provide a total protection layer across the container ratio to small dimension of 0.25, and ratio of containment layer thickness to flow duration of 0.023 in/L, and containment layer thickness to oxygen volume generated of 0.0038 in/L.

The entire assembly, including container 4, containment layer 8, and oxygen outlet 10 including at least a portion of the tubing 12 may be put inside an exterior housing 32 to provide additional protection from the environment, elements, extreme conditions, and situations such as vibration, impact, puncture, heat, cold, water, fire, sand, dusk, fog, humidity, etc. As shown, the assembly is retained within a canvas bag that includes a first end cap 34 and a second end cap 36 to provide access to the activation assembly and oxygen outlet. The bag and/or end caps may include additional insulation layers as well. The end caps may be attached through any mechanism such as hook and loop fasteners, snaps, zipper, etc. The end caps may be attached to a portion of the bag so that an end cap may be easily removed, such as through pulling a tab 37 to deactivate a hook and loop fastener, while retaining the cap to the bag. The first end cap 34 may be positioned so that the activation mechanism 6 is exposed when opened. The end cap may also be configured to easily reapply once the assembly is activated, such as by pulling the tab to reactivate the hook and loop fastener. The end caps may be contoured to cover and exterior portion of the side wall as well as the end portions (for example first end cap 34) or may simply cover the end of the assembly (such as second end cap 36).

The end caps may also be hinged or otherwise configured such that the caps are in a normally closed configuration to provide additional assurance that a user will not contact an exposed surface of the oxygen generator. The end caps may also be configured to permit the activation pin to be removed by a user without requiring the end cap to be removed and or opened, thus potentially exposing an unprotected portion of the oxygen generator. The canvas bag provides a soft/flexible exterior surface to absorb vibration and impact to provide additional protection to the assembly. The canvas bag also provides a rugged exterior surface that may be of a material and/or coated to provide water resistance and/or flame resistance/retardance. In an exemplary embodiment, the canvas bag is made of nylon, Nomex®, Kevlar®, Polybenzimidazole (PBI), or any combination, such as Nomex®-Kevlar® or PBI-Kevlar®.

The exterior housing 32 also includes an exterior sleeve 38 for the oxygen exit tubing 12. The sleeve provides some protection of a user and from the hot exit temperatures of the oxygen gas, while also permitting the gas to begin cooling before reaching the end of the tube. The sleeve 38 also provides protection to the tube 12 from damage during storage, transport, and use in harsh conditions. As shown, the system 2e includes a hot point 40 at the end of the bag sleeve 38, when the oxygen tube is unprotected by any insulation layer of the containment layer and/or exterior layer. Therefore, as configured, the assembly protects a user from the 600° F. (316 C) temperatures obtained at the surface of the oxygen generation container, while still being light weight and practical as a handheld unit. A substantial portion of the device is accessible for careful handling during use. The assembly may include an additional insert at, near, or along the oxygen outlet 10 and connected tubing 12 to divert, mitigate, or otherwise reduce the heat from the exit point hot spot 40 to another location within the device that can be protected and thus minimize the risk to a user.

According to a preferred embodiment the low thickness containment layer is capable of insulating an aviation degree oxygen generator providing an average of at least 3.3 liters per minute of pure oxygen (99.5% oxygen by volume) for an extended period of at least 22 minutes. The preferred oxygen flow rate is about 6.6 LPM, and more preferably 8.0 LPM for at least 20 minutes. According to another embodiment, two or more assemblies can be combined to achieve even higher flow rates. Alternatively, a single generator system may supply oxygen to two or more targets. The device according to this invention is truly handheld, in the sense that it is lightweight (preferably approximately 3 pounds (1.35 kg) or under) and small in its dimensions (preferably 9.8 inches (25 cm) length and 4 inches (10 cm) diameter or under). The novel insulation combination allows acceptable skin contact during operation and the conditions of use.

None of the existing portable devices can provide extended flow of pure oxygen. Typically, devices currently known provide oxygen up to 12 or 15 minutes at lower flow rates and reduced volume concentrations. The extended oxygen flow is essential in extreme conditions for example in medical assistance situations in conditions where help is far away.

Furthermore, using the combination of the insulation materials according to this invention allows higher oxygen flow rates: the minimum flow rate of the instant device is 2.8 LPM, more preferably being 3.3 LPM, or 4 LPM, with an average preferable flow rate of at least 5 LPM and more preferably at least 6 LPM or 6.6 LPM, and with flow rates of up to 8 LPM. The device according to this invention provides higher medically pure oxygen flow rates than any other portable device of its kind and its size currently known for use in extreme conditions without maintenance.

Figure 8:
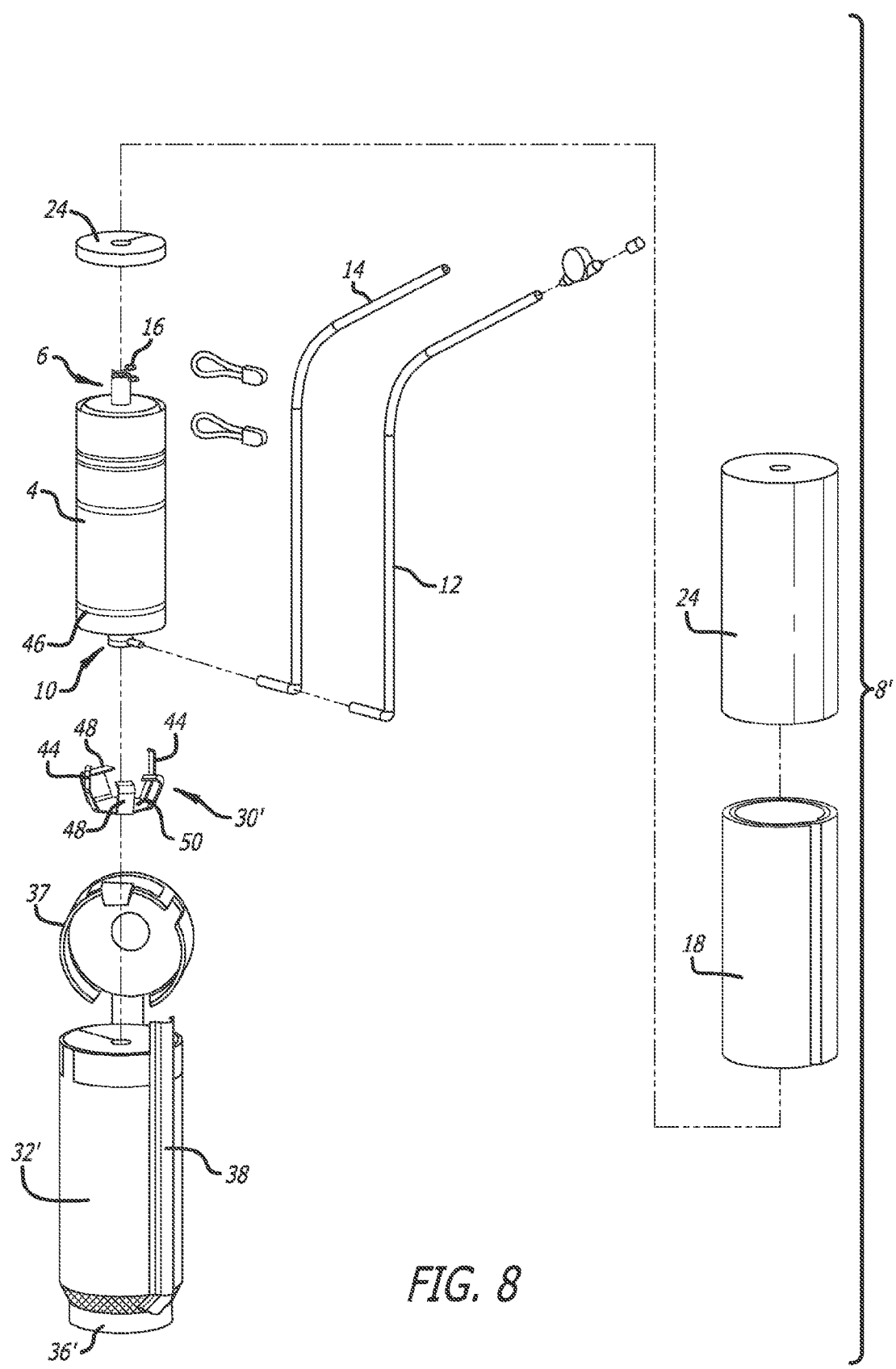
FIG. 8 illustrates an exploded perspective of the various layers and components of an exemplary embodiment of an oxygen generation system according to embodiments as described herein.
Figure 9:
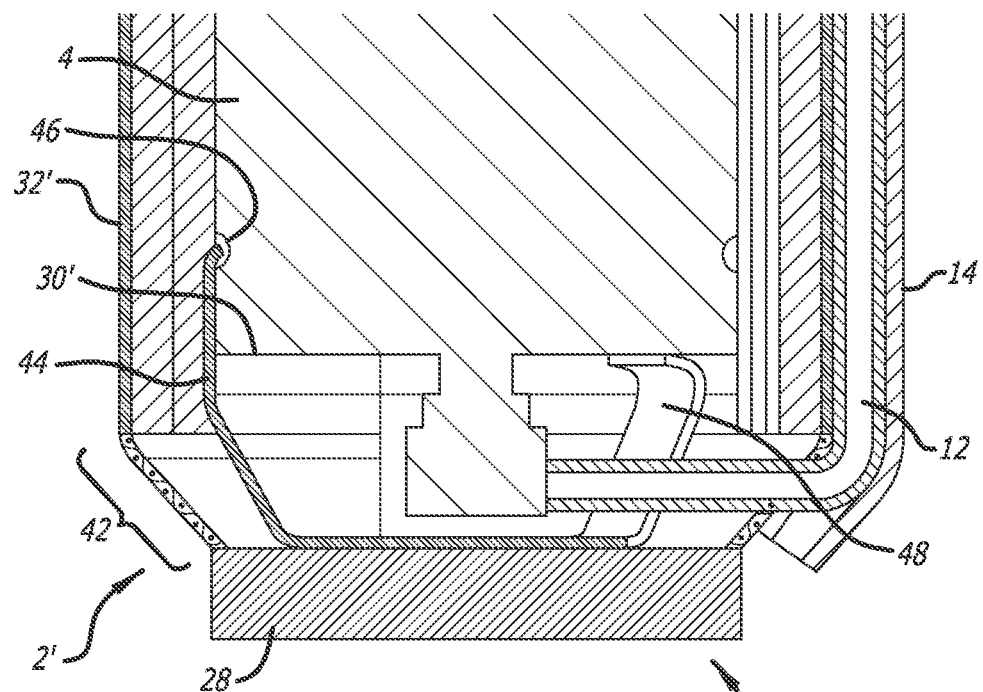
FIG. 9 illustrates a cut away profile of an end portion of the exemplary embodiment of an oxygen generation system as depicted in FIG. 8.

FIGS. 8-9 illustrate an exemplary embodiment of a handheld oxygen generation system 2' according to the invention comprising an oxygen generator container 4 enclosing a chemical core, an activation device 6, a containment layer 8' and an oxygen outlet 10. The handheld oxygen generation system 2' is similar to that of FIGS. 2-7 but provides additional venting of excess heat from the container 4 end near the exit port 10. Features in common with the previous embodiment are identified by like reference numbers and are understood to include the features as described above.

As seen in FIG. 8, an exemplary oxygen generation system 2' includes a heat dissipation vent at one end of the container 4. The heat dissipation vent 42 provides a space between the container end around the exit port 10 and the end cap 36' of the exterior housing 32'. The gap permits heat to dissipate from the container 4 while protecting a user from inadvertent contact. A bracket 30' is used similar to bracket 30 to provide an additional heat shield to the exit port 10. However, bracket 30' includes extended arms to grip an exterior surface of the container 4 to retain the bracket to the container. For example, two arms 44 are used to engage a circumferential groove 46 around the container 4. A set of spacer arms 48 abut an end of the container 4 to ensure a gap is maintained between the container end 4 around the exit port 10 and the heat shield plate 50 of bracket 30'. The gap permits a ventilation path for heat dissipation and provides an impact space to protect the outlet assembly. The end cap insulation layer 28 of FIG. 4 may be incorporated into the end cap 36' to provide an integrated insulation layer within the outer layer 32' at end 36'. End section 36' may be integrally formed to the rest of the exterior housing 32' such that direct access to the exit port and associate heat source is prevented. Ventilation may be obtained through the gap created by bracket 30' by providing holes, mesh, or other breathable material between the exterior housing 32' body portion and end cap 36'. Alternatively, the entire exterior housing 32' may be made of a webbing, mesh, or other breathable material.

The containment layer 8' may also include a different combination of insulation and barrier layers. As shown, a silica aerogel sheet 18, as described above, may be used in a double wrapped layer to insulate the container 4, while foil tape 24 is used to surround, contain, and protect the aerogel layer. The exterior housing 32' may also be configured to prevent removal of the container 4 and/or containment layers 8', and therefore, provide an additional barrier between a user and the aerogel insulation. As shown, the exterior housing 32' may fully surround the container 4 except at the activation assembly 6 to provide access to the activation mechanism. For example, the exterior housing 32' includes a hole at one end to provide passage of the activation assembly 6, but otherwise completely surrounds the container 4. The top end cap 37 provides a removable and replaceable cover across this point. Alternatively, the aerogel may be molded in place of the foil tape to increase protection and contain the aerogel dust.

As shown and described above, the assembly including the containment layer and/or outside exterior housing comprise a combination of generally soft (flexible) materials. However, a hard-shell (non-flexible) casing may also be used for all or a portion of the containment layer and/or the outside exterior housing.

Figure 12:
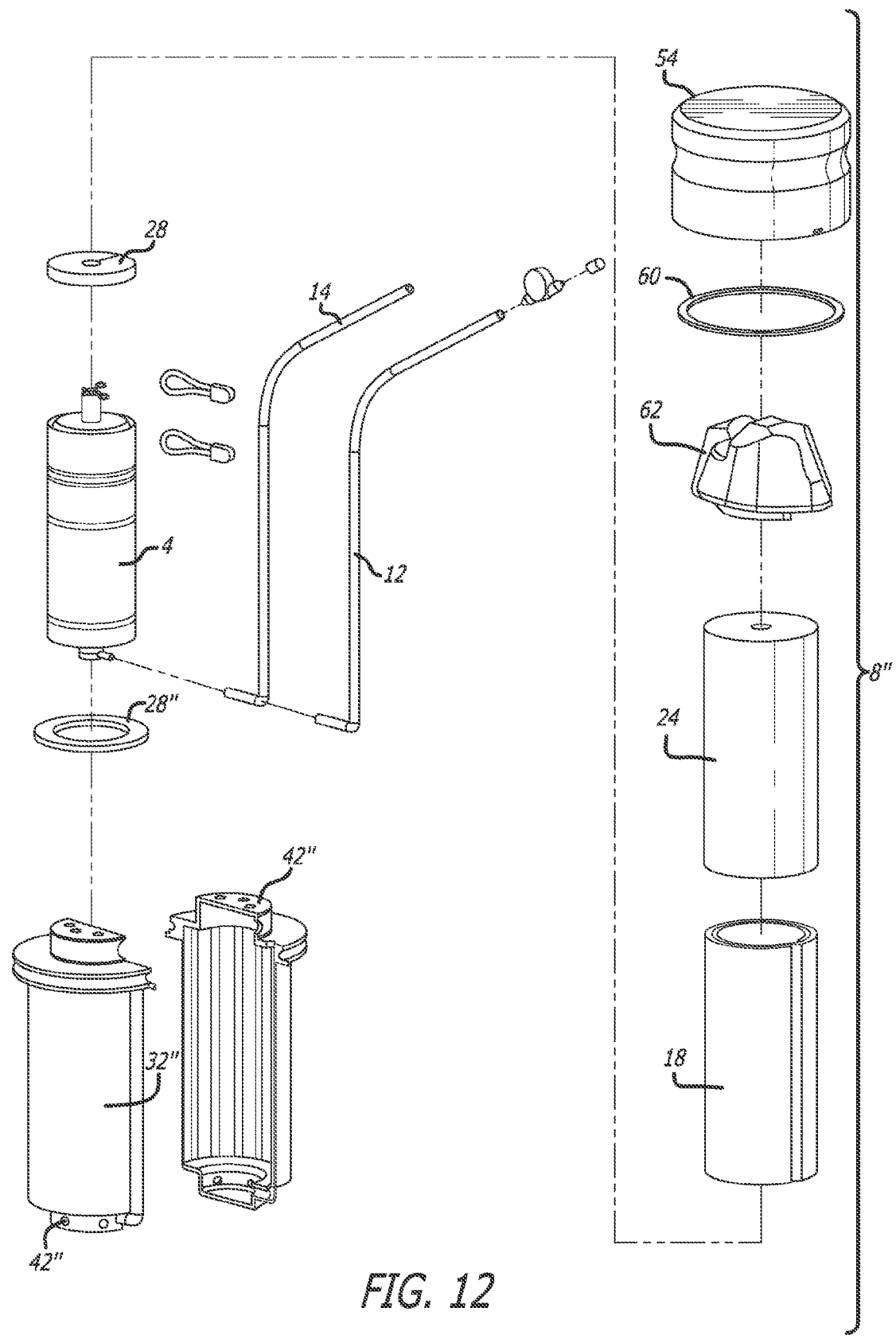
FIG. 12 illustrates an exploded perspective view of the exemplary oxygen generation system of FIG. 10.

FIGS. 10-12 illustrate an exemplary oxygen generation system 2" utilizing a hard exterior housing 32". As shown, the exterior housing 32" integrates the first and second end caps 34" and 36" into an integrated case to fully enclose the container 4. As seen in FIG. 13, the only access to the container is through an access port 52 permitting passage of a connector to the activation pin 16. More than one of these access ports 52 may be provided for a redundant safety to ensure the generator is not accidentally initiated. However, with the cap 54, a redundant activation pin may be unnecessary. The exterior housing 32" may also include heat vents 42" at one or more locations along the exterior housing. As shown, heat vents 42" are provided as a series of holes circumferentially surrounding the exterior housing or around the end of the housing.

The container 4 is separated from the exterior housing 32" by the insulation and barrier layers as described above. For example, an insulation layer of a double wrapped layer of silica aerogel 18 may be used with a barrier and retainer of a foil tape layer 24. Spacers may also be used at the ends of the container such as a silica aerogel end cap 28. As previously described, the end cap 28 may include a hole to permit access to the activation device. The end cap 28" may be arranged to provide an insulating contact between the container 4 and the exterior housing 32" along the end section 36". However, the end cap may otherwise provide a larger opening or access to the end of the container 4 for heat dissipation through vents 42".

The cap 54 may be secured to the exterior housing 32" by screwing, snap, mated detent/flange, projection/insert or other means. As shown, the exterior housing 32" includes a projection 56 that is received into an opening 58 within a peripheral edge of the cap 54. The opening is then shaped to secure the cap to the housing by twisting the cap, thus moving a ledge of the opening around the projection. An o-ring 60 may also be used to seal the cap 54 to the exterior housing 32" to enhance the possible use in the most extreme environments.

The cap 54 may provide a storage space between the end of the exterior housing 34" and the cap 54. The storage space may be used to keep a mask 62, extension or connection hose 14" or other additional or alternative accessories.

The containment layer 8" including the silica aerogel insulation 18 may be molded into the exterior housing 32" along with other materials. For example, a silica aerogel layer is fitted or molded with, within, or into a elastomer, such as a low density elastomeric fire and thermal barrier. In an exemplary embodiment, a Pyrolgel® sheet is combined with another thermal insulation, such as Fastblock® manufactured by Esterline Engineered Materials, to provide an integrated insulation and barrier layers of the containment layer. The shell may be molded in two or more parts for easy manufacturing and assembly around the oxygen generation container. The hard exterior may also provide better protection for both the user and insulation over time.

Embodiments as described herein provide a handheld emergency oxygen solution for immediate use at the point of injury, under the most severe conditions or in the most remote locations until patient/casualty treatment and evacuation can be achieved. The oxygen generation system provides oxygen to a user within seconds, through very easy activation. The stress and immediate need of the situation renders a complicated starting mechanism and preparation set-up unrealistic. The system may be operated in any position at any time (during activation and/or use), not requiring a vertical or horizontal orientation to provide the requisite flow. This further increases the ease and application of the device in the extreme condition for which it may be used. The system may be used in a variety of environments, from the desert to the mountains and may be transported from one to the other, even to high elevation. Embodiments as described herein are compact for easy storage, transportation, and handling, while being rugged enough to handle various high impacts and vibration conditions. The system is also the safest alternative for use and transport, being non-explosive, even if punctured or put in fire or in a blast. Embodiments as described herein provide a grab and go solution that is ready without maintenance, refilling, batteries, or electricity for a specified shelf life duration.

Accordingly, embodiments as described herein provide a solution for controlling the temperature associated with the exothermic reaction to produce oxygen from a chemical generator for a desired period of time (over 18 minutes, preferably over 20 minutes and more preferably over 22 or 36 minutes) at a desired flow rate (for example, at least 4 LPM, 6 LPM, 8 LMP or any combination over the flow duration). Solutions include a low-cost, lightweight, compact and rugged envelope to surround the chemical oxygen generator. The device may be handheld, i.e. sized, shaped, and weight to be grasped and held in one hand. For example, the total assembly weighs less than 3 pounds and has at least one dimension under 5 inches. Embodiments as described herein have an expansive use and storage range of permissible conditions. For example, embodiments of the assembly may be stored at temperatures from −40° F. to +158° F. (−40 C to 70 C), and preferably from 50° F. to 95° F. (10 C to 35 C); with an operating temperature of −4° F. to 155° F. (−20 C to 68 C), and preferably 35° F. to 95° F. (1.6 C to 35 C). The assembly may be stored (i.e. has a shelf life) of approximately 48 months without maintenance. The generator may have a longer shelf life, for example 15 years. Therefore, the assembly may be refurbished to replace the degradable parts, such as the plastic hosing and casings to extend the shelf life with limited maintenance. Therefore, within the no maintenance period, the assembly provides a grab and go oxygen source of over 93%, and preferably approximately 99 to 99.5% pure oxygen by volume without requiring battery and/or electrical power; and filling/re-filling or mixing prior to oxygen initiation Still another advantage of the novel combination of the insulation materials according to this invention is that it allows selecting an oxygen generator that can be used in any position, there is no more a need to have the device in any specific position. This flexibility of the use of the device makes it perfect for use in various emergency situations, such as immediately following earthquakes, floods, and other natural catastrophes. This flexibility also makes it possible to use the device during high altitude expeditions, mining and other similar activities where it may be difficult to set the device into a specific position.

Although this invention has been described with a certain degree of particularity, it is to be understood that the present disclosure has been made only by way of illustration and that numerous changes in the details of construction and arrangement of parts may be resorted to without departing from the spirit and the scope of the invention. In addition, multiple embodiments have been described including features of the oxygen generator, containment layer, exterior housing, connectors, hoses, masks, etc. It is understood that features of the various embodiments may be combined and recombined to form any combination or sub-combination of features within any one assembly. Also, various arrangements have been described using referring to one or more parts as singular or plural. It is understood that the use of the singular and the plural are interchangeable, unless expressly indicated otherwise. The use of a descriptor, such as a first, second, and/or third component, etc., is not intended to limit the quantity of any one or more components, but is intended merely to distinguish between one or more components, such that the first component is different than a second component of the same name. Moreover, reference to the connection or attachment between components is used interchangeable to indicate generally any permissible direct or indirect connection between the identified components.

What is claimed is:

1. A handheld oxygen generator assembly, comprising:
   a chemical oxygen generating unit having an oxygen outlet and activation mechanism;
   a containment layer surrounding the chemical oxygen generating unit, wherein the containment layer is configured to maintain a temperature over an entire exterior surface of the handheld oxygen generator assembly at or below approximately 186° F.;
   wherein the handheld oxygen generator assembly is under at least 10 inches in any dimension, and under approximately 4 pounds.

2. The handheld oxygen generator assembly of claim 1, wherein the chemical oxygen generating unit is capable of producing oxygen for over 15 minutes at a rate of at least 3.3 liters per minute and the handheld oxygen generator assembly includes at least one dimension less than 5 inches and the handheld oxygen generator is approximately 3 pounds or less.

3. The handheld oxygen generator assembly of claim 1, wherein the chemical oxygen generating unit produces oxygen within approximately 5 seconds of activation without requiring preparation and mixing of chemical reactants, generates at least 22 minutes of at least 99% by volume oxygen at a flow rate of at least 4 LPM, and wherein the containment layer maintains a substantial portion of the entire exterior surface at or below approximately 149° F. during operation.

4. The handheld oxygen generator assembly of claim 1, wherein the containment layer comprises a silica aerogel.

5. The handheld oxygen generator assembly of claim 4, wherein the containment layer comprises a barrier layer enclosing the silica aerogel.

6. The handheld oxygen generator assembly of claim 5, wherein the barrier layer comprises fiberglass.

7. The handheld oxygen generator assembly of claim 5, wherein the barrier layer comprises a low density elastomer.

8. The handheld oxygen generator assembly of claim 1, wherein the containment layer comprises a hard exterior.

9. The handheld oxygen generator assembly of claim 1, wherein the containment layer comprises a soft exterior.

10. An oxygen generator assembly for use in extreme and remote environments, comprising:
    a chemical oxygen generator configured to produce oxygen in an exothermic chemical reaction creating temperatures of at least 600° F. at an exterior surface of the chemical oxygen generator;
    a containment layer surrounding the chemical oxygen generator configured to maintain an exposed exterior surface of the oxygen generator assembly at or below 186° F., the containment layer approximately 0.5 inches or less.

11. An oxygen generator assembly for use in extreme and remote environments, comprising:
    a chemical oxygen generator configured to produce oxygen in an exothermic chemical reaction creating temperatures of at least 600° F. at an exterior surface of the chemical oxygen generator;
    an insulating layer surrounding the chemical oxygen generator including an aerogel; and a barrier layer surrounding the insulating layer.

12. The oxygen generator assembly according to claim 11, wherein the barrier layer comprises fiberglass.

13. The oxygen generator assembly according to claim 12, wherein the barrier layer further comprises shrink tubing.

14. The oxygen generator assembly according to claim 12, wherein the insulating layer and barrier layer are individually wrapped sheets of material around the chemical oxygen generator.

15. The oxygen generator assembly according to claim 11, wherein the barrier layer comprises a foil tape.

16. The oxygen generator assembly according to claim 11, wherein the barrier layer comprises a low density elastomer.

17. The oxygen generator assembly according to claim 16, wherein the barrier layer comprises a molded hard shell and the insulating layer comprises a sheet inserted within the barrier layer.

18. The oxygen generator assembly according to claim 16, wherein the barrier layer and insulating layer are integrally formed into a hard shell.

19. The oxygen generator assembly according to claim 11, wherein the chemical oxygen generator is capable of producing oxygen for over 15 minutes at a rate of at least 3.3 liters per minute and the handheld oxygen generator assembly includes at least one dimension less than 5 inches and the handheld oxygen generator is approximately 3 pounds or less.

20. The oxygen generator assembly according to claim 11, wherein the chemical oxygen generator produces oxygen within approximately 5 seconds of activation without requiring preparation and mixing of chemical reactants, generates at least 22 minutes of at least 99% by volume oxygen at a flow rate of at least 4 LPM, and wherein the containment layer maintains a substantial portion of the entire exterior surface at or below approximately 149° F. during operation.

21. A portable oxygen generator assembly configured to be held in use by a human, comprising:
    a. an oxygen generating unit configured to generate oxygen through an exothermic chemical reaction; and
    b. a containment layer (i) surrounding at least a majority of the unit and (ii) comprising (A) an insulation layer comprising silica aerogel and (B) a barrier layer substantially enclosing the silica aerogel, and in which: (1) the barrier layer is configured to protect the silica aerogel from contaminants existing externally of the assembly and protect the human from any escaping particles of the silica aerogel during use of the assembly; and (2) the insulation and barrier layers facilitate holding of the assembly during use without burning the human.

22. An assembly according to claim 21 in which the unit comprises an activation mechanism configured to ignite reactants of the chemical reaction so as to generate oxygen within five seconds of activation.

23. An assembly according to claim 21 in which the containment layer further comprises an outer layer comprising a bag formed of pliant material.

24. An assembly according to claim 21 in which the containment layer further has a hard exterior.

25. An assembly according to claim 21 further comprising:
    a. a flexible tube extending externally of the containment layer for conveying to the human oxygen generated by the unit; and
    b. a protective sleeve surrounding at least a portion of the tube externally of the containment layer.

26. An assembly according to claim 25 in which the flexible tube includes a flow indicator.

* * * * *